United States Patent [19]

Fisher

[11] 4,003,115
[45] Jan. 18, 1977

[54] METHOD OF MAKING CENTRIFUGE CONVEYOR

[75] Inventor: William F. Fisher, Walpole, Mass.

[73] Assignee: Bird Machine Company, Inc., South Walpole, Mass.

[22] Filed: Sept. 25, 1975

[21] Appl. No.: 616,632

[52] U.S. Cl. .............................. 29/156.8 R; 29/460; 198/658; 198/676; 228/175; 228/176; 239/218.5; 302/50; 427/423

[51] Int. Cl.² .................... B21K 3/04; B23P 15/02; B23P 15/04

[58] Field of Search .................. 29/460, 156.8 R; 228/175, 176; 198/213; 239/218.5; 302/50; 427/423

[56] References Cited

UNITED STATES PATENTS

| 261,714 | 7/1882 | Hope | 29/156.8 R UX |
|---|---|---|---|
| 276,103 | 4/1883 | Webster et al. | 198/213 |
| 289,751 | 12/1883 | Chivill | 198/213 |
| 349,807 | 9/1886 | Newsom | 29/156.8 UX |
| 901,819 | 10/1908 | Neitzel | 198/213 |
| 1,939,080 | 12/1933 | Pickard | 29/156.8 R |
| 3,129,504 | 4/1964 | Ivan et al. | 29/156.8 R X |
| 3,937,317 | 2/1976 | Fleury | 198/213 |

*Primary Examiner*—Charlie T. Moon
*Attorney, Agent, or Firm*—Edgar H. Kent

[57] ABSTRACT

A helical bladed conveyor for use in a centrifuge is provided with a wear-resistant outer foward edge by securing to the blade a thin band of metal having an upstanding marginal portion extending beyond the forward face and forming with it a cavity which is filled to the desired depth by fusing a wear-resistant material in place.

6 Claims, 12 Drawing Figures

METHOD OF MAKING CENTRIFUGE CONVEYOR

This invention relates to an improved method of making a helical bladed conveyor having a hardened and wear-resistant outer forward edge on at least a portion of the blade.

Helical bladed conveyors for use in centrifugal separators or solid bowl centrifuges are subject at the outer edge of the blades to unusually high abrasive wear conditions by reason of rubbing contact with the compacted or densified layer of solid particles formed at the inner face of the centrifuge bowl. This layer of solid particles is moved axially of the bowl by relative rotation of the bowl and the conveyor. It has previously been proposed to apply to a portion of the outer forward face of the blade, which is conventionally made of a metal such as steel subject to rapid abrasive wear, one or more layers of hard wear-resistant materials such as nickel alloys, particularly in combination with tungsten carbide particles, the wear-resistant material being supplied in rod form and fused in place by means of an oxyacetylene torch. In some cases, the outer margin of the blade has been beveled inwardly toward the rear face, either before or after applying the coating, and in some cases, the coating has been extended around the outer edge of the blade whether beveled or not. However, in all of these procedures, because of inability to control the dimensions of the outer margin of the coating to the tolerance necessary for proper functioning of the conveyor within the centrifuge bowl, it has been necessary to construct the coated blade oversize in diameter, then grind or machine away the outer margin to the desired finished diameter and shape. It has also been proposed previously to replace a portion of the outer forward face of a blade, which is constructed to be initially oversize in overall diameter, by milling out the forward face of the outer margin of the blade and filling in the cavity with one or more layers of wear-resistant material, the material being applied by spraying it in powder form at elevated temperature so that it is fused in place in one or more layers. In this procedure, an additional smooth coating of a different wear-resistant nickel alloy material has subsequently been applied in a separate step by spraying the material in fused powder form. This procedure has also required the additional step of trimming the blade and coating to the desired finished overall diameter with an inwardly beveled rear edge, the trimming being carried out by means of a plasma arc.

The present invention makes it possible to provide a conveyor blade of a helical bladed centrifuge conveyor with a hardened and wear-resistant outer forward edge with close control of the diameter of the blade and thickness of the wear-resistant material while avoiding the necessity for cutting or machining the wear-resistant portion, thus reducing cost and avoiding waste of expensive material. The method comprises securing to the blade of the conveyor a band of metal having an upstanding marginal portion extending beyond or in advance of the forward face of the blade adjacent its outer edge to form with the forward face a cavity, the outer margin of which is defined by the marginal portion of the band, then filling the cavity to the desired extent by fusing a wear-resistant material at elevated temperature into the cavity to bond the material to the band and to the blade and to fill the cavity to the desired depth with the bonded wear-resistant material forming a portion of the forward face of the blade extending radially inwardly a substantial distance over the forward face of the blade. Preferably the cavity is filled by spraying the wear-resistant material in fusible particulate or powder form at elevated temperature to fuse the particles in place and to bond them to each other as well as to the blade and the band; this procedure may be carried out by conventional flame spraying, detonation-gun plating, or plasma arc coating utilizing the wear-resistant material in the form of a fusible powder or mixture of powders. Such spraying procedures are preferred because less heating and consequently less distortion of the blade is entailed than is the case when the wear-resistant material is applied by a welding procedure using the material in wire or rod form. A variety of wear-resistant materials are available in the form of powders, wires or rods, the preferred materials being nickel alloys, particularly nickel-chromium alloys with or without tungsten carbide particles, the nickel alloys being usually fused at 1850° to 2250° F. The much higher melting tungsten carbide particles are bonded in place by embedding in a nickel alloy matrix.

The band employed for retaining the wear-resistant material may be of any conventional metal such as a soft steel, and it may be identical or similar in composition to the metal of the blade itself or it may be different. It serves to retain the wear-resistant material while the latter is being applied, and it forms the outer margin of the finished conveyor blade after the cavity has been filled; while it is rapidly worn away during use of the conveyor, it is preferably chosen of such thin gauge that the overall diameter of the blade is within the required dimensional tolerance both before and after the band is worn away. In the event that the gauge of the band exceeds the dimensional tolerance for the overall diameter of the blade at some point or points, grinding or machining of the blade will be required, but most of the material removed will be the relatively soft and inexpensive metal of the band instead of the expensive wear-resistant material which is more difficult to machine.

The permissible variation in overall diameter of conveyor blades depends upon the clearance required between the edge of the blade and the inner face of the centrifuge bowl; this in turn depends primarily upon the nature and particle size of the solids being conveyed along the inner wall of the centrifuge bowl and upon the manufacturing tolerances in the inner diameter of the bowl.

The metal band need only be of sufficient thickness to enable it to be properly secured, e.g., by welding, to the body of the plate and to enable it to be formed to and to retain the desired shape and configuration while the wear-resistant material is being applied. In practice, bands having a gauge from 0.030 to 0.060 inch are preferred, although it is possible in some cases to use thinner bands.

During use of the centrifugal separator, the soft metal band is rapidly worn away; however, in the preferred embodiment, because of the thinness of the band the overall diameter of the conveyor blade decreases very little and it still remains within the permissible variation or tolerance after the band has been worn away. The hard wear-resistant material, after the band is worn away, forms the outer edge of the blade so that further decrease in overall diameter occurs only relatively slowly during use.

Bands of metal thicker than 0.060 inch may also be used in the practice of the present invention, but such thickness is unnecessary; the thicker the band, the more wasteful is the process since the band is rapidly worn away in use, and the sooner the overall diameter of the blade will be reduced to the extent that it must be replaced.

The band of metal may be secured in abutting relation to the outer edge of the blade, being fastened or secured in place by welding. It may be welded directly to the outer edge of the blade so as to project forwardly and extend beyond the forward face of the blade, or it may be welded to the rear face or even to the forward face of the blade with the outer marginal portion of the band bent so as to project forwardly of the face of the blade. When the band is welded to a face of the blade, e.g., the rear face, the outer marginal portion of the band may be spaced radially outwardly from the edge of the blade, thus forming a larger or deeper cavity than that formed when the band abuts the blade edge. In both of these cases, the overall diameter of the blade before applying the metal band will be smaller than the desired initial diameter of the blade; in the case where the band abuts the edge of the blade, the difference will be approximately equal to the thickness or gauge of the metal band together with any additional difference provided by flaring or canting of the band; while in the case where the band is secured to the forward or rear face of the blade, the difference will be increased by any radial spacing between the outer marginal portion of the band and the edge of the blade. It is desirable but not essential that the forward corner of the blade be beveled to permit it to be protected by additional thickness of wear-resistant material.

The nature of the invention will appear further from the following description and the appended drawings.

Figure 1:
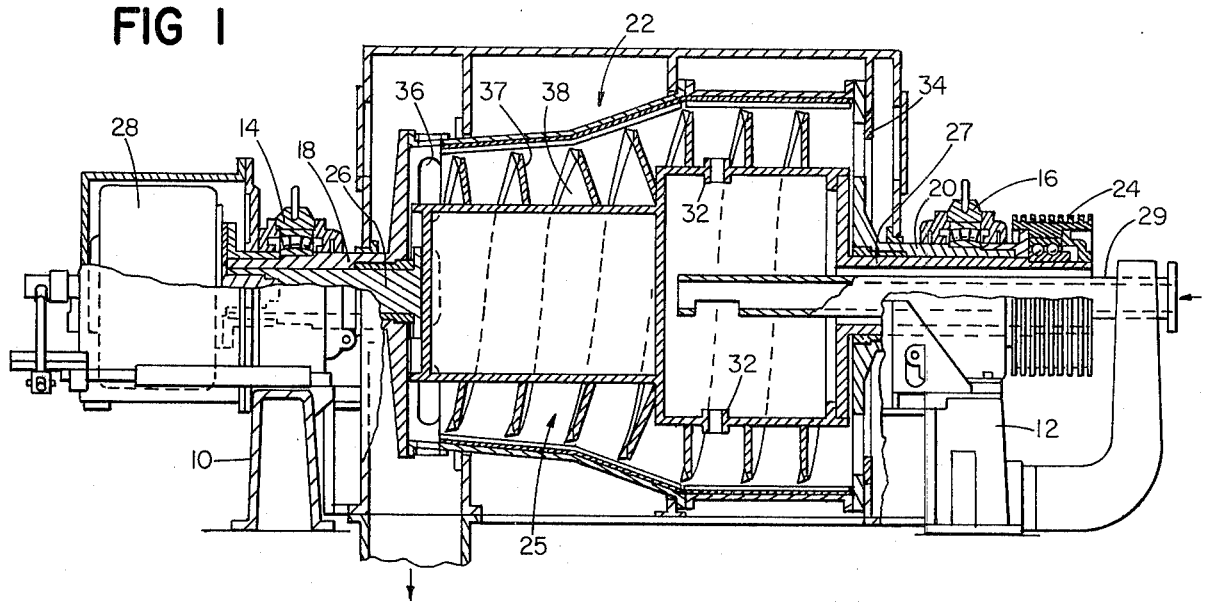
FIG. 1 is a view in cross-section showing a centrifugal separator embodying a bladed conveyor made in accordance with the present invention.

As shown in FIG. 1, the centrifuge includes a pair of standards 10, 12 supporting bearings 14, 16 within which are rotatably mounted two hollow shafts 18, 20. Centrifuge bowl 22 is mounted between the shafts and rotated with them by means of drive sheave 24. Helical bladed conveyor 25 is mounted coaxially within bowl 22 on shafts 26, 27 for rotation at a speed different from that of the bowl through reduction gear unit 28. An inlet pipe 30 is provided extending through coaxial hollow shafts 20, 27 through which the slurry to be subjected to centrifugation is introduced, passing through ports 32 of the conveyor into centrifuge bowl 22 where it is separated by centrifugal force into an outer layer of solid particles compacted against the inner face of the centrifuge bowl and an inner or central layer of liquid. The liquid layer is withdrawn over the rim or margin of dam or weir 34, while the compacted layer of solid particles is advanced along the wall of the bowl by relative rotation of conveyor 25 and bowl 22 until it reaches outlet aperture 36 through which it passes relatively free from liquid.

Figure 2A:
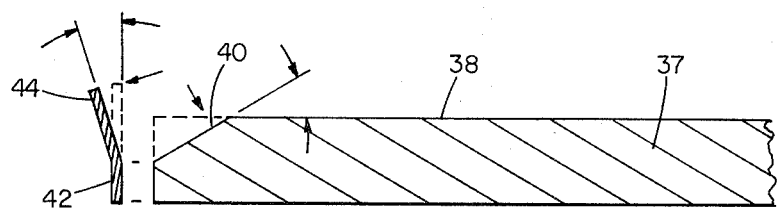
FIGS. 2a–2e are sectional views on an enlarged scale of a conveyor blade showing successive stages of one embodiment of the process of the invention.
Figure 2B:
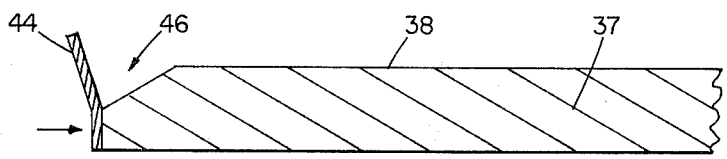
Figure 2C:
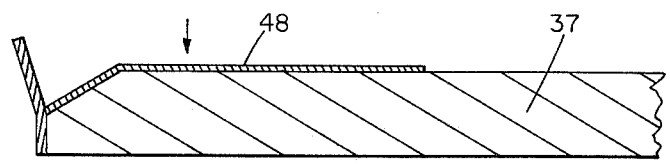
Figure 2D:
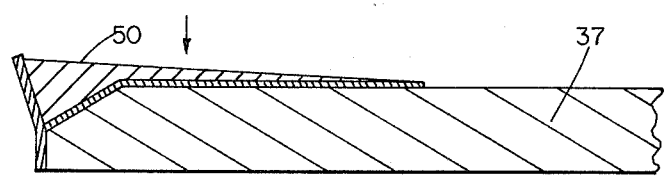
Figure 2E:
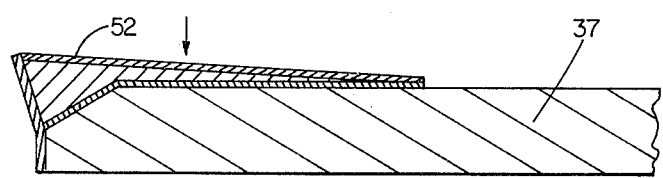

As shown in FIGS. 2a–2e, in one embodiment of the process the outer forward corner of blade 37 is beveled at an angle of 30° as shown at 40, a retaining band 42 of steel having a gauge of approximately 0.030 inch is formed or bent to the desired angular cross-sectional configuration, then secured by welding in abutting relation to the outer edge of blade 37 as shown in FIG. 2b with its upstanding marginal portion 44 extending beyond and in advance of forward face 38 to form with it a cavity 46, the outer margin of which is defined by marginal portion 44. There is then applied by flame spraying within the cavity a layer 48 of a nickel chromium alloy such as that sold under the trade name Bronzochrom 10185 powder, the flame spraying causing the particles of powder to fuse and to provide particularly good bonding to the steel of the blade as well as to band 42 and to each other. The flame spraying is continued using a mixture of tungsten carbide particles with particles of a different nickel chromium alloy such as the mixture sold under the trade name Tungtec 10112 to deposit a harder fused layer 50 overlying layer 48 and substantially filling the remainder of cavity 46. A powder mix of carbide particles and nickel base matrix such as that sold under the trade name Diamax 10999 which forms a very smooth fused surface coating 52 is added on top by flame spraying. The portion of the wear-resistant material extending over the forward face of the blade serves not only to protect it against wear but also serves to anchor to the blade the outer marginal portion of wear-resistant material (i.e., the portion adjacent band 44).

Figure 3A:
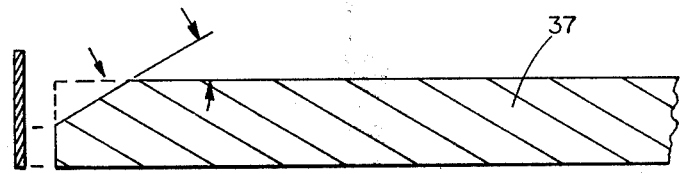
FIGS. 3a–3c are sectional views showing successive stages of a second embodiment of the process.
Figure 3B:
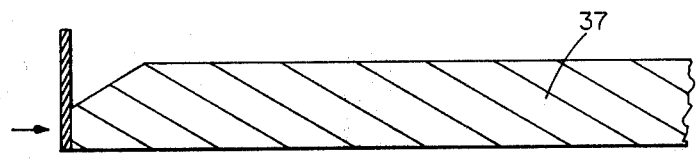
Figure 3C:
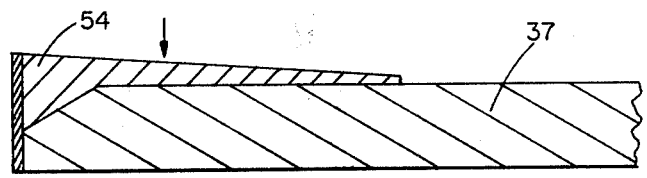

As shown in FIGS. 3a–3c, similar results can be obtained by flame spraying application of a single mixture of tungsten carbide particles with particles of nickel chromium alloy to form a single layer 54 of wear-resistant material covering the outer forward face of blade 37.

Figure 4A:
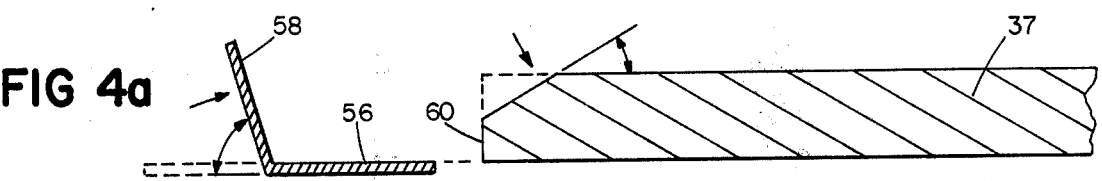
FIGS. 4a–4c are sectional views showing successive stages in a third embodiment.
Figure 4B:
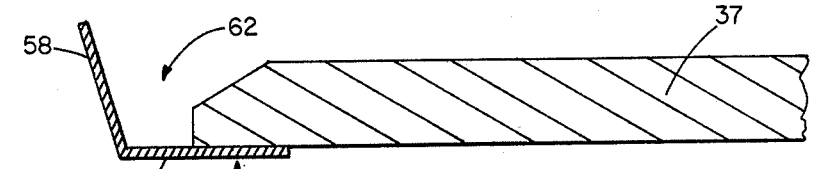
Figure 4C:
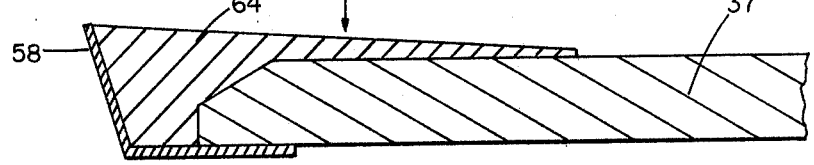

In the embodiment of the process illustrated in FIGS. 4a–4c, a band 56 of conventional steel having a gauge of approximately 0.060 inch is formed or shaped to provide an upstanding marginal portion 58 and is then secured by welding to the rear face of blade 37 with its upstanding marginal portion 58 extending beyond the forward face of the plate and adjacent to but spaced radially outwardly beyond the outer edge 60 of the blade, thus forming with the forward face of the plate a cavity 62. The cavity is then filled by flame spraying with a wear-resistant mixture of tungsten carbide particles and particles of nickel chromium alloy forming a layer 64 of wear-resistant material in which the particles are bonded to each other as well as to the blade and to band 56, 58, to form a finished blade having bonded wear-resistant material 64 forming a portion of the forward face of the blade adjacent its outer edge.

In use of the blades made by the method of the present invention, the upstanding marginal portion 44, 58 of the retaining band is rapidly worn away, leaving the wear-resistant material to form the outer forward edge of the blade.

Similar results are achieved when the wear-resistant layers are applied from powder by detonation gun plating or by plasma spraying. The wear-resistant material can also be applied by a conventional welding procedure using the material in wire or rod form to achieve the same advantages. However, this procedure suffers from the disadvantage that greater distortion of the conveyor blade takes place as a result of the higher temperature to which the blade is subjected during the application of the wear-resistant material.

The retaining band may be used with a straight cross-sectional configuration if desired instead of being formed or bent to provide an outwardly extending flare, but the latter form is preferred, the marginal portion extending outwardly at an angle of up to 30° from the central axis (or axis of rotation) of the blade. The thickness of the layer of wear-resistant material is not critical and may vary to provide the extent of protection against wear which is desired.

What is claimed is:

1. The method of providing a hard wear-resistant outer forward edge on at least a portion of a blade of a helical bladed centrifuge conveyor which comprises securing to a blade of said conveyor a band of metal having an upstanding marginal portion thereof extending beyond the forward face of said blade adjacent its outer edge to form with said forward face a cavity, said band defining the outer margin of said cavity, fusing a wear-resistant material at elevated temperature into said cavity to bond said material to said band and to said blade and to fill said cavity to the desired depth with said bonded wear-resistant material forming a portion of the forward face of said blade.

2. The method as claimed in claim 1 in which the step of fusing the wear-resistant material is carried out by spraying said material in particulate form to bond said particles to each other and to said band and blade.

3. The method as claimed in claim 2 in which said band is secured in abutting relation to the outer edge of said blade.

4. The method as claimed in claim 2 in which said band is secured to said blade with its upstanding marginal portion spaced radially outwardly beyond the outer edge of said blade.

5. The method as claimed in claim 4 in which said band is secured in abutting relation to the rear face of said blade.

6. The method as claimed in claim 2 in which the band has a gauge of 0.030 to 0.060 inch and in which the outer marginal portion thereof is flared outwardly from the central axis of the blade.

* * * * *